(12) United States Patent
Wagner et al.

(10) Patent No.: US 11,268,263 B2
(45) Date of Patent: Mar. 8, 2022

(54) ELECTRIC EXCAVATOR

(71) Applicant: Guangxi LiuGong Machinery Co., Ltd., Guangxi (CN)

(72) Inventors: Edward Wagner, Guangxi (CN); Sean Plante, Waverly, IA (US)

(73) Assignee: Guangxi LiuGong Machinery Co., Ltd., Guangxi (CN)

( * ) Notice: Subject to any disclaimer, the term of this patent is extended or adjusted under 35 U.S.C. 154(b) by 98 days.

(21) Appl. No.: 16/689,510

(22) Filed: Nov. 20, 2019

(65) Prior Publication Data

US 2021/0062459 A1 Mar. 4, 2021

(30) Foreign Application Priority Data

Aug. 26, 2019 (WO) ................ PCT/CN2019/102580

(51) Int. Cl.
| | | |
|---|---|---|
| *E02F 9/22* | (2006.01) | |
| *F15B 21/14* | (2006.01) | |
| *E02F 3/32* | (2006.01) | |
| *E02F 3/42* | (2006.01) | |
| *F15B 1/02* | (2006.01) | |
| *F15B 1/04* | (2006.01) | |
| *F15B 13/02* | (2006.01) | |

(52) U.S. Cl.
CPC ............ *E02F 9/2217* (2013.01); *E02F 3/32* (2013.01); *E02F 3/425* (2013.01); *E02F 9/22* (2013.01); *F15B 1/024* (2013.01); *F15B 1/04* (2013.01); *F15B 13/024* (2013.01); *F15B 21/14* (2013.01); *F15B 2201/00* (2013.01)

(58) Field of Classification Search
CPC .......... E02F 9/2217; F15B 1/024; F15B 21/14
See application file for complete search history.

(56) References Cited

U.S. PATENT DOCUMENTS 6,918,247 B1 * 7/2005 Warner ................. E02F 9/2217
                                                    60/414
7,434,391 B2 * 10/2008 Asam .................... E02F 9/2217
                                                    60/414

(Continued)

FOREIGN PATENT DOCUMENTS

| CN | 103806482 A | 5/2014 |
| CN | 103452149 B | 7/2015 |

(Continued)

OTHER PUBLICATIONS

European Search Report in corresponding European U.S. Appl. No. 19/210,330, dated Jun. 23, 2020, 8 pags.

*Primary Examiner* — Michael Leslie
(74) *Attorney, Agent, or Firm* — Young Basile Hanlon & MacFarlane, P.C.

(57) ABSTRACT

An excavator with a boom comprises a main electrical drive system with an electrical power storage unit. The excavator comprises an electrical drive configured to actuate movement of the boom to raise and/or lower part of the boom. The excavator comprises a separate fluid-operated, auxiliary actuation system for storing potential energy of the part of the boom during lowering thereof and for using the stored potential energy to support raising of the part of the boom. The auxiliary actuation system is configured to store the potential energy and to support raising the part of the boom autonomously without interaction with the main electrical drive system.

19 Claims, 3 Drawing Sheets

(56) References Cited

U.S. PATENT DOCUMENTS

| | | | | |
|---|---|---|---|---|
| 8,286,426 | B2* | 10/2012 | Bishop | F15B 21/14 |
| | | | | 60/413 |
| 8,938,956 | B2* | 1/2015 | Asam | E02F 9/2217 |
| | | | | 60/329 |
| 8,997,476 | B2* | 4/2015 | Brinkman | E02F 9/2217 |
| | | | | 60/414 |
| 9,151,018 | B2* | 10/2015 | Knussman | E02F 9/2296 |
| 9,163,385 | B2* | 10/2015 | Lavergne | F16F 9/0236 |
| 9,418,451 | B2* | 8/2016 | Taguchi | G06T 11/003 |
| 9,518,593 | B2* | 12/2016 | Mori | F15B 11/168 |
| 9,638,217 | B2* | 5/2017 | Yang | E02F 9/2217 |
| 9,791,015 | B2* | 10/2017 | Kloft | B66F 9/22 |
| 2015/0030424 | A1 | 1/2015 | Stulen et al. | |

FOREIGN PATENT DOCUMENTS

| | | |
|---|---|---|
| EP | 2645533 A1 | 10/2013 |
| JP | H09158248 A | 6/1997 |
| JP | 2014206252 A | 10/2014 |
| JP | 2015197032 A | 11/2015 |
| KR | 10-20100018969 A | 2/2010 |
| WO | 2008013466 A1 | 1/2008 |

* cited by examiner

ELECTRIC EXCAVATOR

RELATED APPLICATIONS

This application claims priority to International Application No. PCT/CN2019/102580, filed Aug. 26, 2019, which is incorporated herein in its entirety by reference.

TECHNICAL FIELD

The present invention relates to an excavator with a moveable boom. The excavator comprises an electric drive system.

BACKGROUND OF THE INVENTION

Excavators are essential tools for modern construction and mining work. For example, excavators may be used for moving materials and/or earth. For that purpose, excavators usually comprise a moveable boom. To this boom, tools such as a shovel may be attached. With the moveable boom, material or earth gathered in the shovel may be lifted from the ground and released from the shovel at a higher position. Accordingly, the boom may be moved, in particular pivoted, upwards and downwards.

Excavator operations are energy intensive. Accordingly, one of the major factors of the operation costs of a conventional excavator is its energy consumption in the form of fuel. Another major factor for the operation costs are maintenance costs, e.g. for replacing or repairing moveable parts. For reducing operating costs of the excavator, energy recovery systems are known. KR 1020100018969 A relates an excavator equipped with an auxiliary driving means for a working device, the auxiliary driving means being formed in the form of a spring or hydraulic system. CN 103806482 A describes an auxiliary power energy-saving device for an excavator that comprises a double-cylinder connecting seat, a nitrogen cylinder, a hydraulic cylinder and a control valve. CN 103452149 B and JP 2014206252 A both also describe how to recuperate potential energy during raising and lowering of a boom. Furthermore, electrification of the drive train has reached the construction machinery business. EP 2 645 533 A1 relates to an electric excavator having a travelling electric motor for powering movement of the excavator's tracks, for example.

SUMMARY

The present invention relates to an excavator with a moveable boom. The boom may include one or more pivotably connected arms and/or an excavator tool such as a shovel or drill. The tool may be rigidly or moveably connected to the boom. Alternatively or additionally, the tool may be removably or permanently attached to the boom. At least a part of the boom may be moved upward against gravity and downward in the gravity direction, which will also be referred to as raising and lowering of the boom, respectively. Raising of the boom may also be referred to as lifting of the boom.

The excavator comprises a main electrical drive system with an electrical power storage unit and an electrical drive configured to actuate movement of the boom to raise or lower at least part of the boom, in particular with a pivoting movement. A main electrical drive system is efficient and environmentally friendly. In particular compared to a combustion engine, the main electrical drive system is simple and easy to service. The main electrical drive system may be configured to move the boom with an electric motor or may first convert the electric energy provided by the storage unit into another energy form, in particular hydraulic energy in a main hydraulic system. The power storage unit is preferably a battery, in particular a rechargeable battery. The electrical drive system may also be configured for driving the excavator, for example by turning wheels and/or tracks of the excavator. Preferably, the electrical energy provided by the power storage unit is directly converted by the main electrical drive system into kinetic energy moving the tracks and/or wheels of the excavator. Alternatively, the wheels and/or tracks may also be moved via the hydraulic system powered by the main electrical drive system. The main electrical drive system may also be referred to as main electrical actuation system, main system, electrical drive system and/or main drive system. Preferably, the excavator does not comprise means to generate electrical energy for the main electrical drive system, such as a combustion engine. Instead, it may only rely on the electrical power storage unit for providing its operating power.

For example, the excavator may comprise an upper carriage and an under carriage. The upper carriage may also be referred to as base section or superstructure of the excavator. The under carriage may also be referred to as drive section of the excavator. The upper carriage may, for example, comprise a cab for an operator or driver of the excavator and may be that part of the excavator to which the boom is attached. The upper carriage may comprise a platform for supporting the boom and/or the operator's cab of the excavator. The under carriage may comprise the wheels and/or tracks of the excavator and may be configured to rest on the ground. The upper carriage may also be referred to as the turret of the excavator. The under carriage and the upper carriage are usually pivotably or swiveably attached to each other; in particular allowing the two sections to pivot or swivel relatively to each other around a vertical axis. Preferably, the vertical axis is a vertical center axis. The pivoting of the upper carriage relatively to the under carriage may be driven by the main electrical drive system. However, the main electrical drive system may also be provided only to actuate the boom. The main electrical drive may comprise at least one electrical motor. The electrical drive may drive a hydraulic pump, which may be configured to pressurize a hydraulic system in an excavator. Via the hydraulic system, the boom of the excavator may be actuated. Alternatively, the electrical drive may actuate the boom directly without any energy conversion therebetween.

Further, the excavator comprises a separate fluid-operated auxiliary actuating system, in particular a hydraulic and/or pneumatic auxiliary actuating system. Preferably, this system does not comprise a power supply for its actuation. It may be supplied with power from the electrical power storage unit upon activation and then work autonomously therefrom. In particular, the auxiliary actuation system may work passively, in particular after an initial pressurization, and/or independently of the energy supply of the main drive system. The separate fluid-operated auxiliary system is configured to store potential energy of at least part of the boom during lowering thereof and to use the stored energy to support raising of at least part of the boom, wherein the auxiliary actuation system is configured to store the energy and to support raising the part of the boom completely autonomous without any interaction with the main electrical drive system. In other words: The auxiliary actuation system is configured to store potential energy freed during lowering of at least part of the boom and to use the stored energy to support raising of at least part of the boom independently from the main electrical drive system.

The auxiliary actuation system therefore provides for an energy recuperation, which may be considered a hydraulic and/or pneumatic energy recuperation driven by gravity, for example. Optionally, the auxiliary actuation system does not comprise a motor, pump and/or any other form of pressure source. Accordingly, the auxiliary actuation system is simple and easy to service while being able to greatly increase efficiency of the excavator. In particular, energy requirements during raising and lowering of the boom may be reduced. Further, as the auxiliary system supports raising of the boom, other systems for actuating the boom, such as the main electrical drive system, may be designed for a lower maximum load. The auxiliary actuation system provides a counterbalanced boom design. The auxiliary actuation system may also be called a recuperation and actuation system. The recuperation may avoid or reduce an increase in temperature in the hydraulic fluid of a main hydraulic actuation system during lowering of the boom as hydraulic breaking of the boom movement with the main hydraulic actuation system may be avoided or reduced. The separate fluid-operated auxiliary actuation system may also be referred to as the auxiliary system.

The part of the boom that is moved, in particular lowered and raised, depends on the kinematic boom design. For example, the boom may just be configured as one rigid arm attached to the upper carriage of the excavator. However, the boom may, for example, also comprise a first arm swiveably attached to the upper carriage of the excavator and a second arm swiveably attached to the first arm, wherein the tool is attached to the second arm. In the latter case, both the first and second arms may be lowered and raised during actuation of the boom. The auxiliary system may be designed to recuperate from and support raising of only one of the arms of the multiple arm boom. However, there may also be provided a separate auxiliary actuation system and/or actuator and/or accumulator for each moveable part of the boom, e.g. for each arm. The auxiliary actuation system may recuperate energy just from a pivoting motion around one pivot axis or several or all of the pivoting axes of the boom. In particular, one auxiliary hydraulic actuator may be provided for each axis that allows raising and lowering of a part of the boom. For example, one auxiliary actuation system for each movement axis for which recuperation is desired may be provided. Similarly, the main electrical actuation system may actuate each part or just a single part of the boom.

An underlying idea of the excavator according to the present invention is to combine an efficient electrical system with an efficient hydraulic and/or pneumatic recuperation system to provide an efficient and simple excavator. Surprisingly and contrary to what a person skilled in the art expects, such a combination of two systems working with different power transmissions principles may overall reduce complexity of the excavator, simplify maintenance and increase efficiency beyond an excavator using either both an electrical auxiliary recuperation and an electrical main drive system or both a hydraulic auxiliary recuperation and a hydraulic main drive system. By comparison, here it has been recognized that a passive fluid-operated recuperation system may be even more environmentally friendly and efficient than an electrical recuperation system. The present idea overcomes a technical prejudice regarding the benefits of electric actuation, in particular the before-mentioned presumed beneficial combination of electric actuation and electric recuperation. Further, a fluid-operated system may be even more efficient when just passively transforming potential energy into pressure and pressure into kinetic energy than compared to the transformation necessary for electrical recuperation. In addition, the fluid-operated recuperation system may simply comprise a fluid-operated actuator and a fluid-operated accumulator and may be designed and integrated into the excavator independently of the main electrical drive system, while the electrical recuperation system needs to be designed and integrated with a main electrical drive system.

Preferably, the auxiliary system is designed to provide a maximum load and/or power output that is lower than the power output and/or load required to raise the part of the boom, in particular when the tool is loaded and/or empty. Alternatively or additionally, the auxiliary system is designed to provide a maximum load and/or power output that is lower than those of the electrical main drive system and/or a main hydraulic system, which may be powered by the electrical main drive system. Preferably, the electrical main drive system and/or a main hydraulic system, which may be powered by the electrical main drive system, are configured to provide a maximum load and/or power output that is sufficient to raise the boom in an empty state, such as with an empty shovel. Preferably, the electrical main drive system and/or a main hydraulic system, which may be powered by the electrical main drive system, are configured to raise a loaded boom, for example with a shovel full of earth or material, only with the support of the auxiliary system. This allows for a particular compact and efficient excavator.

In a further embodiment of the excavator, the auxiliary actuation system comprises at least one actuator, optionally a cylinder, that is coupled to the boom and at least one accumulator. The actuator and the accumulator of the auxiliary system are coupled such that lowering of part of the boom pressurizes the accumulator and such that raising of part of the boom may be supported, in particular by energy stored in the accumulator of the auxiliary actuation system. The auxiliary actuation system does not need any additional parts. The accumulator and actuator may be fluidically connected to each other for their coupling. In particular, the accumulator and actuator may be connected with a fluid line, which is configured to conduct pressurized fluid, such as oil or gas. Pressurization may involve compressing a medium of the fluid-operated system, such as a fluid or gas. However, pressurization may, for example, alternatively or additionally involve deforming an elastic part of the accumulator, such as a membrane, to store energy in the auxiliary system. The actuator may be coupled to the boom, preferably mechanically connected at a pivot joint. In particular, the actuator may be fixed to a moveable part of the boom with a moveable part of the actuator, in particular a shaft of a hydraulic or pneumatic cylinder.

In a further embodiment of the excavator, the electrical main drive system is configured to pressurize a main hydraulic system that is configured to actuate boom movement. Such an excavator combines the environmental and maintenance advantages of an electrical power system with the advantage of the fluid-operated actuation system that high maximum loads may be realized. The main hydraulic system preferably comprises at least one hydraulic actuator, such as a cylinder. The excavator may comprise a main hydraulic system with at least one hydraulic actuator, optionally a cylinder, for moving the part of the boom and a hydraulic pump for actuating the hydraulic actuator, wherein the hydraulic pump is powered by the main electrical drive system, e.g. an output shaft of the electrical drive system being mechanically connected to the hydraulic pump.

In a further embodiment, the hydraulic actuator of the main hydraulic system and the auxiliary actuator of the auxiliary system are arranged in parallel. Such an arrangement simplifies integration of the auxiliary system. In particular, both actuators, for example cylinders, may be arranged in parallel with one or both ends attached to the same joint, bearing and/or shaft, respectively. For example, both actuators may use a common shaft for attachment to the upper carriage of the excavator and an arm of the boom, respectively. In particular, both the hydraulic actuator of the main hydraulic system and a hydraulic actuator of the auxiliary system may have the same length or may even be identical, thus further reducing complexity of the excavator.

In a further embodiment, the actuator of the auxiliary system is arranged above the hydraulic actuator of the main hydraulic system. In particular, the auxiliary actuator is arranged, e.g. entirely, above the main hydraulic actuator at least in the raised position of the part of the boom, preferably in every position of the boom. The auxiliary actuator may not intersect with the main hydraulic actuator when seen from the side of the excavator. One end of the actuator of the auxiliary system is preferably attached to the upper carriage of the excavator above an attachment position of the boom and/or the main hydraulic actuator to the upper carriage. One end of the hydraulic actuator of the main hydraulic system is preferably attached to the upper carriage of the excavator below an attachment position of the boom to the upper carriage. The other end of the actuator of the auxiliary system is preferably attached closer to the end of the boom attached to the upper carriage, i.e. more distally, than the other end of the hydraulic actuator of the main hydraulic system that is attached to the boom. Above and below may be defined by a vertical direction, by gravity and/or the lowering and raising of the boom. This embodiment allows for a compact design with optimized loading profile. Preferably, the auxiliary actuator is placed besides or above the boom. This allows for good visibility.

In a further embodiment, the main hydraulic system has a higher maximum power output than the auxiliary system and/or the main hydraulic actuator is larger than the auxiliary hydraulic actuator. A larger hydraulic actuator may have a larger diameter, length, maximum pressure and/or maximum power output. The main hydraulic system may thus provide the main power output with an environmentally friendly and simple system while the auxiliary recuperation system may be easily integrated into the excavator while still being sufficiently powerful to recuperate the potential energy freed during lowering of the boom. In particular, a smaller and/or less powerful auxiliary system may be sufficient as, in normal operations, at least some of the potential energy gained during lifting of the boom will be lost without being recoverable due to dumping of the contents of the shovel of the excavator at a raised position of the boom, for example into a cargo bed of a truck.

In a further embodiment, the auxiliary actuator is attached with one end to an upper carriage of the excavator, wherein a front of the upper carriage may be defined by the end closest to an attachment position of the boom to the upper carriage and a back of the upper carriage may be defined by its opposite end. Preferably, the auxiliary actuator is attached to a side surface of the boom. The side surface preferably faces to the left or right when the operator's cab is facing in a driving direction, e.g. forward or backwards. The side surface is preferably facing away from the operator's cab. This may allow a compact excavator design. Further, operation of the auxiliary actuator may easily be supervised by the driver of the excavator together with regular boom operation, as the auxiliary actuator may be at least partially or completely arranged in the field of vision of the driver.

Alternatively or additionally, the auxiliary actuator is attached to the upper carriage within the first 60% of the forward-backward extension starting from the forward end, preferably 40%, even more preferably 30%. This allows for a compact excavator design. In addition, attachment of the auxiliary actuator to the upper carriage may thus be conducted close to the attachment position of the boom to the upper carriage, resulting in a uniform load distribution, in particular with an auxiliary system retrofitted to an excavator. Further alternatively or additionally, the auxiliary actuator does not cross or overlap the operator's cab in a direction orthogonal to the forward-backward direction. This prevents the auxiliary actuator from interfering with an access to the cab of the excavator. Further, this prevents obstructing sideway vision. The auxiliary actuator is preferably also not arranged above the cab.

A forward direction may be defined as the normal driving direction, in particular with the upper carriage aligned to the under carriage, and/or orientation of the tool of the excavator and/or the boom. A backward direction may be defined as the opposite, in particular the opposite side. The orthogonal direction may be defined as the side-view of the forward-backward direction and/or a left-right direction, in particular with regard to the upper carriage. Preferably, the end of the auxiliary actuator opposite the end attached to the boom is attached to the upper carriage. Further preferably, the auxiliary actuator is usually only attached to the upper carriage of the excavator and to the boom.

Further alternatively or additionally, a rod end of the auxiliary cylinder is attached to the boom of the excavator and a cylinder end of the auxiliary actuator is attached to the upper carriage of the excavator. The rod end may correspond to a plunger part of the actuator and the cylinder end to a cylinder part in which the plunger part is at least partially arranged. Such an arrangement shifts the center of gravity of the auxiliary actuator closer to its pivoting axis at the upper carriage. Accordingly, a smaller momentum is required to also lift the actuator together with the boom during its actuation, e.g. raising, thus reducing overall power requirements. Also, such attachment of the auxiliary actuator facilitates attachment and/or arrangement of the auxiliary actuator above or at the side of the boom.

Preferably, any main hydraulic actuator is arranged on the excavator similarly to the above-described arrangements of the auxiliary actuator. In particular, a rod end of the main hydraulic cylinder is attached to the boom of the excavator and a cylinder end of the main hydraulic is attached to the upper carriage of the excavator.

Further alternatively or additionally, the auxiliary actuator is at least partially arranged in the same vertical plane extending in the forward-backward direction as a main hydraulic actuator. Such an arrangement avoids unnecessary restriction of the field of vision for the driver while also resulting in a compact excavator design. The arrangement is particularly beneficial if the auxiliary actuator is arranged above the main hydraulic actuator, as described above. For example, a main cylinder and an auxiliary cylinder may at least partially overlap when seen from a top view in at least one position of the boom. Preferably, the main hydraulic actuator and the auxiliary actuator are configured to actuate the same part of the boom.

In a further embodiment, the auxiliary actuation system is passively controlled. In particular, passive control may mean that the actuator is mechanically synchronized to the boom movement and/or does not require any control signals to activate its recuperation and/or support function. In particular, freed potential energy may automatically be stored during lowering of the boom and be automatically used to support subsequent raising of the boom. For example, the main drive system may comprise a control system that controls the electrical power supply and/or the direct electrical drive for controlling movement of at least part of the boom. By comparison, the auxiliary actuation system may not comprise such a control system and may not be connected to the control system of the main drive system either. The auxiliary system may receive no commands for actuation from a control system, in particular the control system controlling the main drive system. Recuperation during lowering and support during raising of at least part of the boom occurs automatically in response to the movement of at least part of the boom, in particular due to a coupled movement of an actuator of the auxiliary actuation system. In a very simple example, the auxiliary actuation system has no actively controlled valves, but just passively counterbalances the boom. A passively controlled auxiliary actuation system is particularly simple and cost-efficient. Servicing such a system is also easy. In addition, no complex integration with other system controls is necessary. Further, the driver of the excavator can concentrate on controlling its main functions, such as driving and actuating the boom, without adding the burden of controlling a further system.

In a further embodiment, the auxiliary actuation system comprises a valve for filling and/or emptying the system with a fluid and a control unit for controlling the valve. Such a valve may provide easy means to allow releasing pressure when use of the excavator and/or boom is terminated, and to provide initial pressurization. Said control unit may not control auxiliary actuation system operations itself, such as storing energy and/or supporting the boom raising. Accordingly, the control unit may be powered by the electrical power storage unit of the main electrical drive system while the auxiliary actuation system is still operating during lowering and raising of the boom autonomously of the main system.

In a further embodiment, the auxiliary actuation system is configured to release pressure, in particular from the accumulator, when the main drive system is powered down and/or when the excavator is turned off. In particular, pressure may be released after powering down and/or turning off. The pressure may be released until an internal pressure in the auxiliary actuation system is below a threshold pressure and/or has arrived at an ambient pressure. The threshold may be defined as a safety limit and/or may be predetermined with a pressure relief valve. Releasing the pressure may mean that the pressure is reduced, preferably while retaining any hydraulic or pneumatic fluid. The pressure release results in a safe state of the auxiliary system when the excavator and/or boom is not in use. Further, unwanted boom movement by the auxiliary system may be prevented. Preferably, the control unit is configured to open the valve to release pressure from the auxiliary actuation system, in particular from its accumulator when the excavator is turned off.

In a further embodiment, the main drive system is configured to pressurize the auxiliary actuation system when the main drive system is powered up and/or when the excavator is turned on. In particular, the auxiliary actuation system may be pressurized after powering up and/or turning on. Usually, the boom will be at a lowered position when the excavator is turned off and/or the actuation system is powered down. The lowered position may, for example, be a position where the boom is resting on some surface, for example on the upper carriage of the excavator and/or the ground. If the auxiliary system is pressurized before lifting the boom from such a position, the auxiliary actuation system may also support raising the boom during the initial first lift after powering up the excavator. Accordingly, the main electrical drive system does not need to provide the power required to raise the boom without support by the auxiliary actuation system, in particular with a loaded tool. Accordingly, the main electrical drive system may be designed with a lower maximum power output, thus possibly being more compact and having lower costs. The main electrical drive system may provide an initial pressurization of the auxiliary system, in particular above an ambient pressure. This pressurization may enable the auxiliary actuation system to support raising a boom without previously storing potential energy freed during lowering of the boom. The pressurization may, for example, be a compression of the fluid of the auxiliary actuation system or pressurization of an accumulator. For the pressurization, a pump of the main electrical drive system and/or a main hydraulic system may be selectively fluidically connected to the auxiliary system, for example with a fluid line and/or valve. Connection of the main and auxiliary systems for initial pressurization may be particular simple if both are using the same fluid, such as a hydraulic oil, as a pressure medium.

Optionally, the valve of the auxiliary actuation system controlled by its control unit is fluidly connected to the main hydraulic system and the control unit is configured to open the valve to fill the auxiliary actuation system with fluid from the main hydraulic system and/or equalize pressure in both the main and auxiliary system when the excavator is turned on. The equalization may result in pressurizing the auxiliary system while nearly maintaining pressure in the main system.

Additionally in a preferred embodiment of the excavator, the main drive system is configured to pressurize a main hydraulic system that is configured to actuate boom movement, wherein the auxiliary actuation system is pressurized by the main hydraulic system when the main drive system is powered up and/or when the excavator is turned on. For that purpose, the two systems may temporarily be fluidically connected to each other. After pressurization, the connection is preferably closed. Pressurization may be defined as raising an internal pressure of the auxiliary system, preferably to a pressure equal to an internal pressure of the main hydraulic system. The connection may be controlled by a valve. The valve may be controlled by a control system, for example electronically controlled, in particular with the control system of the main electrical drive system. The valve may alternatively be controlled passively in response to a pressure differential between the main hydraulic system and the auxiliary system. In that case, if a pressure difference from the main to the auxiliary system is above a threshold, the valve is opened. Preferably, that threshold is below the lowest pressure differential due to normal auxiliary hydraulic system operations, in particular pressure with the boom at its highest position. In particular, the auxiliary system may be connected to a pressure relief of the main hydraulic system. For pressurizing the auxiliary system, the main hydraulic system may simply be over-pressurized and no further active control is required.

In a further embodiment, the auxiliary actuation system is configured to be only pressurized due to the storage of potential energy freed during lowering of at least part of the boom. Such a configuration may allow for a completely passively operating auxiliary actuation system. No connection to a main electrical drive system is required in that case, in particular no hydraulic connection to a main hydraulic system. The excavator and in particular auxiliary actuation system design and integration may be particularly simple in that case. Initial raising of the boom may not be supported by the auxiliary actuation system in that case. Instead, only after the first lowering of the boom, stored energy may be used by the auxiliary actuation system to support subsequent raising of the boom.

In a further embodiment, a fluid of the auxiliary actuation system is a gas, in particular nitrogen or air, or an oil, in particular a hydraulic oil. A gas may allow the fluid itself to effectively store energy by compression. Accordingly, an accumulator may not be necessary or may be incorporated into an internal volume of the pneumatic actuator, such as within a cylinder. An oil as a hydraulic fluid may allow higher peak output. The accumulator and the actuator of the auxiliary actuation system may be pneumatically operated, optionally by nitrogen and/or air. The accumulator may also comprise a gas separated from an operation fluid of the auxiliary system by a membrane, wherein the accumulator stores energy by deformation of the membrane and compression of the gas. Such an accumulator may therefore be incorporated into a hydraulic auxiliary actuation system. Alternatively, the actuator of the auxiliary actuation system is hydraulically operated, optionally by oil, and the accumulator has a gas as a compression medium for storing energy, optionally nitrogen and/or air. Pressurization may involve compressing the compression medium of the fluid-operated auxiliary system. Pressurization may additionally involve deforming an elastic part of the accumulator, such as a membrane, to store energy in the auxiliary system. Said membrane may separate the compression medium from a hydraulic fluid in the accumulator.

Other features of the present invention will be apparent from consideration of the information contained above as well as in or in combination with the following detailed description, drawings and claims. The present invention is illustrated by way of example, and not by way of limitation, in the figures of the accompanying drawings.

DETAILED DESCRIPTION OF PREFERRED EMBODIMENTS

Figure 1:
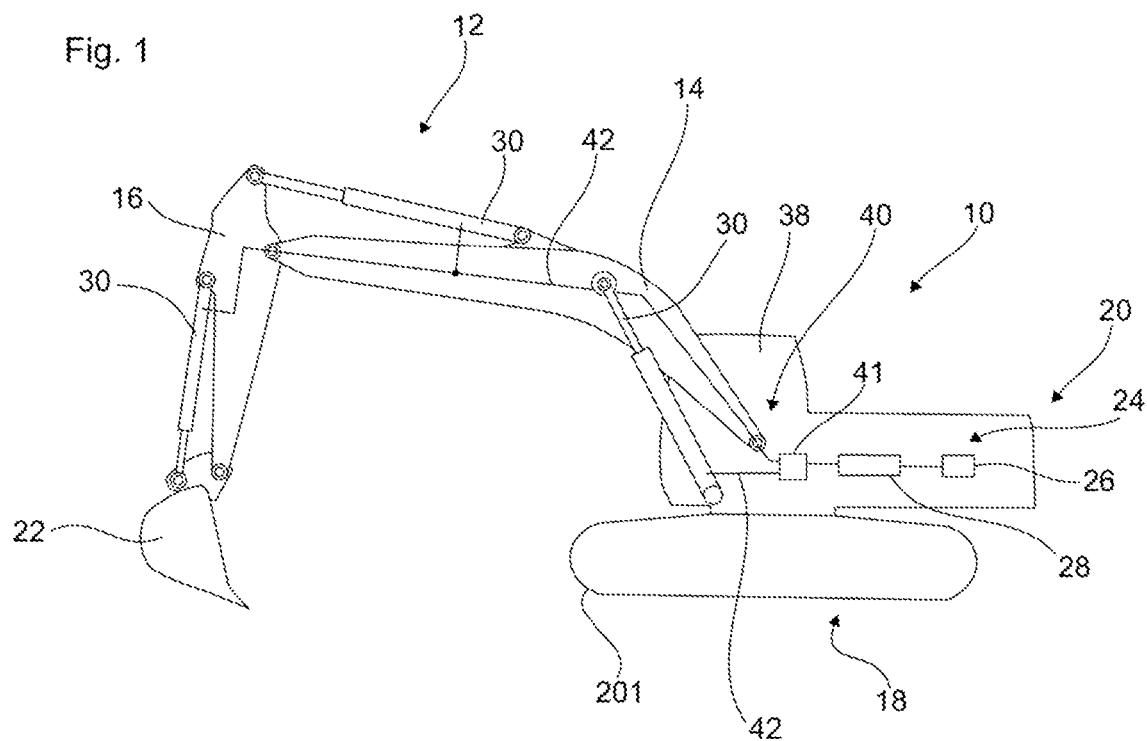
FIG. 1 shows in a schematic side view an excavator with a moveable boom.

FIG. 1 shows an excavator 10 with a movable boom 12. In the given example, the boom 12 comprises a first arm 14 and a second arm 16 that are pivotably attached to each other. The excavator 10 comprises an under carriage 18 and an upper carriage 20. The under carriage 18 comprises tracks 201 which allow the excavator to move over terrain. The upper carriage 20 is pivotably attached to the under carriage 18 so that they may turn relatively to each other around a vertical axis. The under carriage 18 supports the upper carriage 20. The upper carriage 20 may also be referred to as the turret of the excavator 10. The upper carriage 20 provides the platform for supporting the boom 12 and a cab 38 for the operator or driver of the excavator 10. Specifically, the proximal end of the first arm 14 is pivotably attached to the upper carriage 20. Furthermore, an opposite distal end of the first arm 14 is preferably connected with a proximal end of the second arm 16. The opposite distal end of the second arm 16 and the tool 22 of the boom 12 are also pivotably attached to each other. In the present example, the tool 22 is a bucket.

The excavator 10 comprises a main electrical drive system 24 with an electrical power unit 26 in the form of a battery and an electrical drive 28, e.g. an electric motor. The necessary power to operate the excavator 10 and in particular the electrical drive 28 is only provided by the electrical power unit 26. In particular, no combustion engine is provided. The main electrical drive system 24 is configured to actuate movement of the boom 12 to raise and lower at least part of the boom 12. In particular, as can be taken from FIG. 1, the boom 12 comprises several actuation cylinders 30 that may allow to move each of the first and second arm 14, 16 as well as the tool 22. Each cylinder 30 may be actuated by the main electrical drive system 24. In one embodiment, the excavator 10 comprises a main hydraulic actuation system 40, which is powered by the main electrical drive system 24. In that case, the electrical drive 28 powers a hydraulic pump 41 that generates hydraulic pressure to activate hydraulic cylinders 30 via hydraulic lines 42. Alternatively, the electrical drive 28 may also directly actuate each of the movable parts of the boom 12. Furthermore, the main electrical drive system 24 may also pivot or swivel the upper carriage 20 relatively to the under carriage 18 and/or drive the tracks 201 to move the excavator 10.

Raising at least a part of the boom 12 increases the potential energy in said part of the boom 12. Such a movement may also be called lifting of the boom 12. Accordingly, raising the boom 12 requires more power than lowering of the boom 12. In particular, lowering the boom 12 may not even require any energy at all but is just caused by gravity. Breaking during lowering of the boom 12 may be controlled by a hydraulic valve in its actuation system. During lowering of the boom 12, the potential energy of the raised position is freed and thus available for recuperation.

Figure 2:
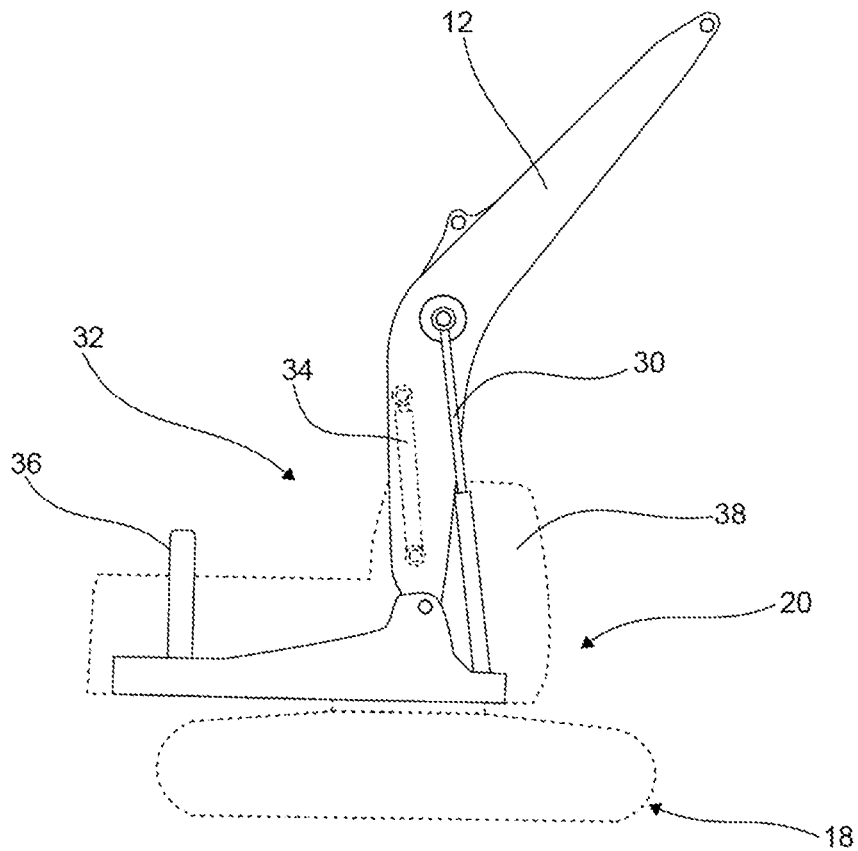
FIG. 2 illustrates in a schematic side view the excavator according to FIG. 1 with an auxiliary actuation system and its boom in a raised position according to an embodiment.

This freed potential energy may therefore be recuperated to increase the overall efficiency of the excavator 10. For that purpose, the excavator 10 comprises an auxiliary fluid-operated actuation system 32, of which one embodiment is shown in FIG. 2 and another in FIG. 5. In the present examples, a hydraulic oil is used as the fluid and the auxiliary actuation system 32 will henceforth be called the auxiliary hydraulic actuation system 32, although the system 32 could also be designed as an auxiliary pneumatic actuation system 32 using gas as the fluid. The auxiliary hydraulic actuation system 32 does not comprise or use a power supply for actuation. Instead, the auxiliary hydraulic actuation system 32 is configured to store potential energy freed during lowering of at least part of the boom 12 and to use the stored energy to support raising of at least part of the boom 12 independent of a power source during its operation. The auxiliary actuation system 32 is configured to store the energy and to support raising the part of the boom 12 completely autonomous without any interaction with main electrical drive system 24.

Figure 3:
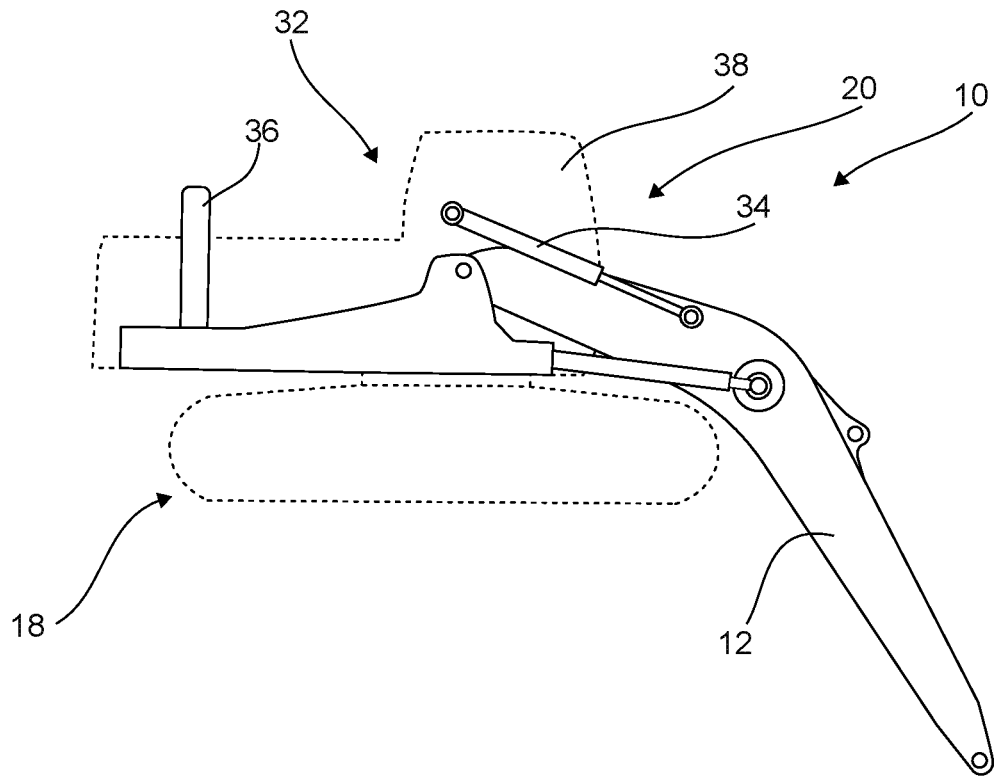
FIG. 3 illustrates the embodiment according to FIG. 2 with the boom in a lowered position.

For that purpose, the embodiment of the auxiliary hydraulic actuation system 32 comprises an auxiliary hydraulic cylinder 34 and an accumulator 36. To illustrate the working principal of the auxiliary hydraulic actuation system 32, FIG. 2 shows a raised position of the boom 12 (only the first arm 14 of the boom being shown) and FIG. 3 shows a lowered position of the boom 12 (also only the first arm 14 of the boom being shown). As can be seen from a comparison of FIG. 2 and FIG. 3 with FIG. 1, only the first arm 14 is counterbalanced with the auxiliary actuation system 32 for recuperation during lowering and support during raising. Similar systems and/or components could be provided to other arms of the boom 12 as well. Alternatively, the boom 12 shown in said embodiment could also comprise just a single arm and would thus be less complex then the boom 12 shown in FIG. 1. However, the overall working principal of the recuperation is the same, regardless of which part of the boom 12 is raised or lowered and/or connected to an auxiliary actuation system.

As can be seen in FIG. 2, in the position in which the auxiliary hydraulic actuation cylinder 34 is fully retracted, the boom 12 is raised. In that position, the accumulator 36 and the overall auxiliary hydraulic actuation system 32 is not pressurized, in particular relative to an ambient pressure. When lowering the boom 12, the auxiliary hydraulic cylinder 34 is extended. Due to this extension, there is a pressure increased in the auxiliary hydraulic actuation system 32, which stores the freed potential energy during lowering of the boom 12 in the accumulator 36. When lifting the boom 12 from the lowered position shown in FIG. 3 to the raised position of FIG. 2, the thus stored potential energy may be used to retract the auxiliary hydraulic cylinder 34, thus supporting raising of the boom 12. Therefore, overall required power output to raise the boom 12 may be reduced. The operation of the main hydraulic actuator 30 shown in FIGS. 2 and 3 during raising of the boom 12 is supported by the auxiliary hydraulic cylinder 34.

Figure 4:
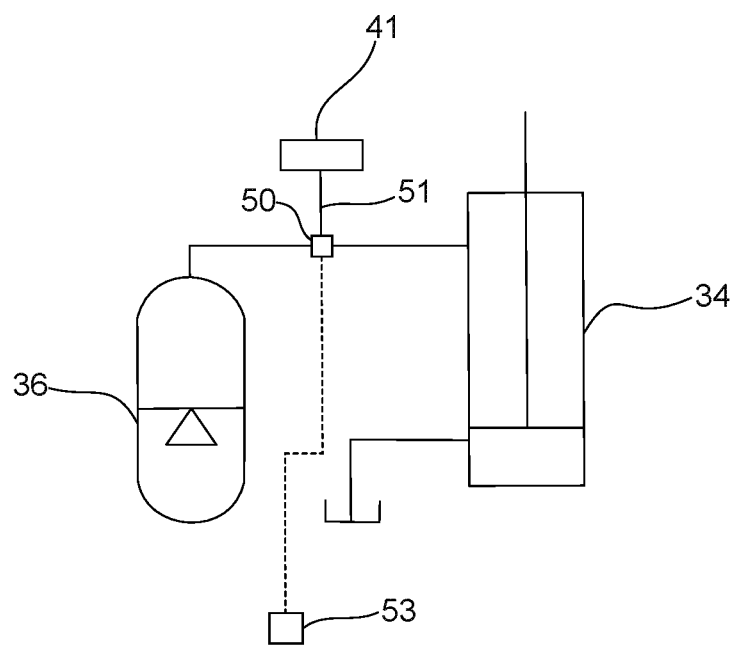
FIG. 4 schematically illustrates the auxiliary actuation system of the embodiment according to FIG. 2.

FIG. 4 illustrates in a schematic view the connection of the auxiliary hydraulic cylinder 34 with accumulator 36. As can also be taken from FIG. 4, the auxiliary hydraulic actuation system 32 does not necessarily require an active control and/or any valves. Accordingly, the system is simple, easy to service and cost-effective. However, a valve 50 and optionally also a control unit 53 could be added to provide depressurization of the auxiliary actuation system 32 after shutdown of the excavator 10. Alternatively or additionally, the valve 50 and control unit 53 could also serve to initially pressurize the auxiliary actuation system 32 via the hydraulic pump 41, which was described above, and a fluid connection line 51. A similar configuration could also be provided for the other embodiment. Specifically, when turning on the excavator 10, the control unit 53 might be configured to open the valve 50, thereby pressurizing the auxiliary actuation system with hydraulic fluid from the main hydraulic system 40, i.e. via the hydraulic pump 41. Once pressurized, the control unit 53 is configured to close the valve 50 and keep it closed during operation of the auxiliary actuation system. Likewise, when the excavator 10 is turned off, the control unit 53 may be configured to open the valve 50 again to de-pressurize the auxiliary actuation system.

Figure 5:
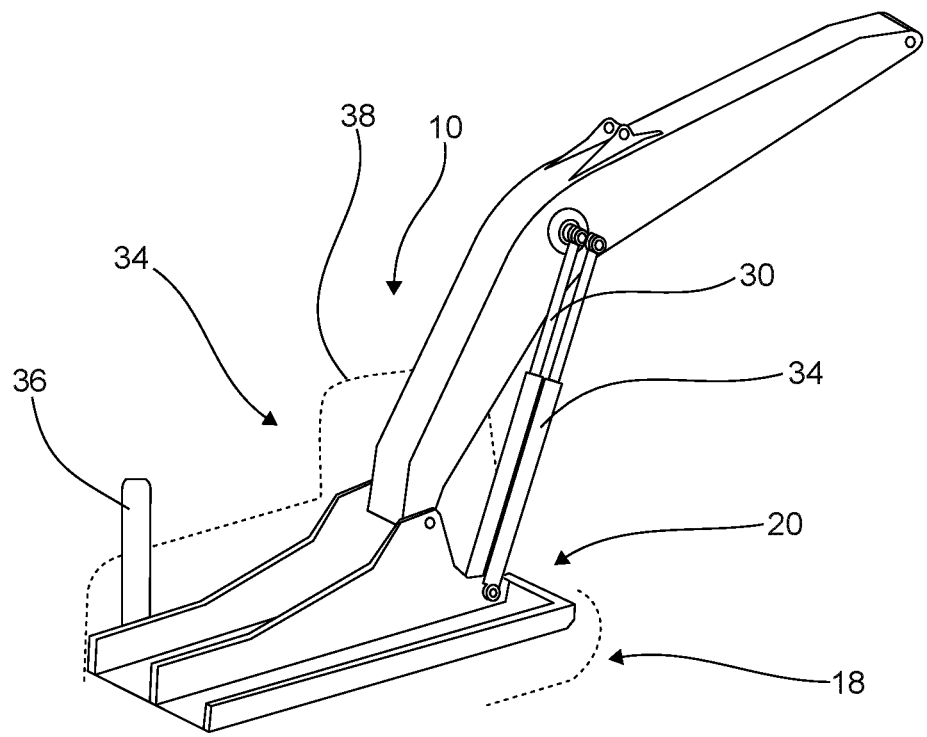
FIG. 5 illustrates in a schematic perspective view the excavator according to FIG. 1 with an auxiliary actuation system and its boom in the raised position according to a further embodiment.
Figure 6:
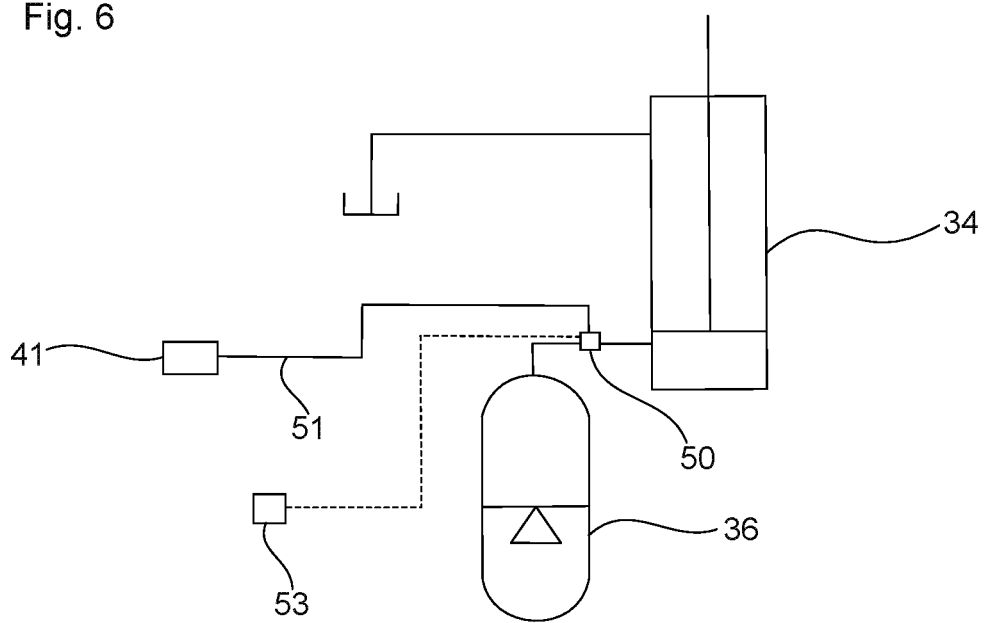
FIG. 6 schematically illustrates the auxiliary actuation system of the embodiment according to FIG. 5.

FIG. 5 and FIG. 6 illustrate another embodiment of the auxiliary hydraulic actuation system 32. Here, the auxiliary hydraulic cylinder 34 is supporting raising of the boom 12 with the main hydraulic actuator 30 during extension of the auxiliary hydraulic actuator 34. Correspondingly, during lowering of the boom 12, the auxiliary hydraulic actuator 34 is compressed, thus pressurizing the auxiliary hydraulic actuation system 32 and in particular the accumulator 36 to store the freed potential energy. The system shown in FIG. 6 may also comprise a valve 50, a fluid line 51 and a control unit 53, which may be configured and connected to the main hydraulic system 40 as described in connection with FIG. 4.

In both embodiments, the auxiliary hydraulic actuators 34 are attached with their rod end, which is their distal end, to the boom 12 and a cylinder end, which is the proximal end, of the auxiliary hydraulic actuator 34 is attached to the upper carriage 20 of the excavator.

Besides the working direction of the auxiliary hydraulic actuator 34 in each of the embodiments shown in FIG. 2 and FIG. 5, the attachment position of the auxiliary hydraulic actuators 34 to the upper carriage 20 and the boom 12 is also different. FIG. 5 illustrates an embodiment where the auxiliary hydraulic actuator 34 is arranged in parallel to the main hydraulic actuator 30. Both ends of each the main hydraulic actuator 30 and the auxiliary hydraulic actuator 34 are mounted to the same respective shaft to be pivotably connected with one end each to the upper carriage 20 and the boom 12. In particular, the design of the auxiliary hydraulic actuator 34 and the main hydraulic actuator 30 is identical in this embodiment, allowing the use of more identical parts.

By comparison, in the embodiment of the auxiliary hydraulic actuation system 32 shown in FIG. 2 and FIG. 3, the auxiliary hydraulic actuator 34 is arranged above the main hydraulic actuator 30. Due to this arrangement, the auxiliary hydraulic actuator 34 may be smaller and less powerful than the main hydraulic actuator 30. This also allows the auxiliary hydraulic actuator 34 to be arranged at essentially the same position in the left right direction of the excavator 10 as the main hydraulic actuator 30. Due to this arrangement, the vision for the driver of the excavator 10 may be obstructed less.

REFERENCE SIGNS 10 excavator
12 boom
14 first arm
16 second arm
18 under carriage
20 upper carriage
22 tool
24 main electrical drive system
26 electrical power storage unit
28 electrical drive
30 main hydraulic actuator
32 auxiliary hydraulic actuation system
34 auxiliary hydraulic actuator
36 accumulator
38 cab
40 main hydraulic system
41 hydraulic pump
42, 51 hydraulic line
50 valve
53 control unit

The invention claimed is:

1. An excavator including a boom, comprising:
a main electrical drive system including an electrical power storage unit and an electrical drive configured to actuate movement of the boom to raise and/or lower part of the boom with a pivoting movement;

a main hydraulic system including a hydraulic actuator for moving the part of the boom and a hydraulic pump for actuating the hydraulic actuator, wherein the hydraulic pump is powered by the main electrical drive system; and a separate fluid-operated auxiliary actuation system for storing potential energy of the part of the boom during lowering thereof and for using the stored potential energy to support raising of the part of the boom, wherein the separate fluid-operated auxiliary actuation system is configured to store the potential energy and to support raising the part of the boom autonomously without interaction with the main electrical drive system, the separate fluid-operated auxiliary actuation system comprising:

an auxiliary actuator coupled to the boom, the auxiliary actuator comprising a rod end attached to the boom of the excavator and a cylinder end attached to an upper carriage of the excavator that is higher than the boom when the boom is at rest so that a center of gravity of the auxiliary actuator is closer to a pivoting axis at the upper carriage; and at least one accumulator, wherein the auxiliary actuator and the at least one accumulator are coupled so that lowering of the part of the boom pressurizes the at least one accumulator and so that raising of the part of the boom is supported by potential energy stored in the at least one accumulator.

2. The excavator according to claim 1, wherein the hydraulic actuator of the main hydraulic system and the auxiliary actuator of the auxiliary actuation system are arranged in parallel to each other.

3. The excavator according to claim 1, wherein the auxiliary actuator of the auxiliary actuation system is arranged above the main hydraulic system.

4. The excavator according to claim 1, wherein the main hydraulic system has a higher maximum power output than the auxiliary actuation system.

5. The excavator according to claim 1, wherein the auxiliary actuator is attached at one end to an upper carriage of the excavator, and wherein the auxiliary actuator is attached to a side surface of the boom, the side surface facing away from an operator's cab of the excavator.

6. The excavator according to claim 1, wherein the auxiliary actuation system is passively controlled during the storing of potential energy and the lifting of the part of the boom.

7. The excavator according to claim 1, wherein the auxiliary actuation system comprises a valve for filling and/or emptying the at least one accumulator with a fluid and a control unit for controlling the valve.

8. The excavator according to claim 7, wherein the control unit is configured to open the valve to release pressure from the at least one accumulator when the excavator is turned off.

9. The excavator according to claim 7, wherein the valve is fluidly connected to the main hydraulic system, and wherein the control unit is configured to open the valve to fill the at least one accumulator with fluid from the main hydraulic system and/or equalize pressure in both the main electrical drive system and the auxiliary actuation system when the excavator is turned on.

10. The excavator according to claim 1, wherein the auxiliary actuation system is configured to be pressurized from storage of potential energy during lowering of the part of the boom.

11. The excavator according to claim 1, wherein the at least one accumulator and the auxiliary actuator of the auxiliary actuation system are pneumatically operated.

12. The excavator according to claim 1, wherein the auxiliary actuator of the auxiliary actuation system is hydraulically operated and the at least one accumulator comprises a gas acting as a compression medium for storing potential energy.

13. The excavator according to claim 1, wherein the hydraulic actuator is larger than the auxiliary actuator.

14. The excavator according to claim 1, wherein the auxiliary actuator does not cross or overlap an operator's cab of the excavator in a direction orthogonal to a forward-backward direction of the excavator.

15. The excavator according to claim 1, wherein the auxiliary actuator is at least partially arranged in a same vertical plane along a horizontal axis of the excavator as a main hydraulic actuator.

16. An excavator, comprising:
a main electrical drive system, comprising:
an electrical power storage unit; and
an electrical drive configured to actuate pivotable movement of a boom to raise and/or lower the boom;
a main hydraulic system, comprising:
a hydraulic actuator coupled to the boom and an upper carriage of the excavator and configured to move the boom; and
a hydraulic pump coupled to the hydraulic actuator and the upper carriage and configured to actuate the hydraulic actuator that is powered by the main electrical drive system; and
an auxiliary actuation system configured to passively operate independently of the main hydraulic system, the auxiliary actuation system comprising:
an auxiliary actuator coupled to the boom and the upper carriage at locations above the hydraulic actuator when the boom is lowered so that the auxiliary actuation system does not interfere with a line of sight of an operator of the excavator, wherein a rod end of the auxiliary actuator is attached to the boom of the excavator and a cylinder end of the auxiliary actuator is attached to an upper carriage of the excavator so that a center of gravity of the auxiliary actuator is closer to a pivoting axis at the upper carriage; and
an accumulator coupled with the auxiliary actuator configured to store potential energy while the boom is lowered, and configured to utilize the potential energy that is stored to support the main hydraulic system in raising of the boom without interaction between the main hydraulic system and the auxiliary actuation system so that lowering of the boom pressurizes the accumulator and so that raising the boom by the main hydraulic system is supported by potential energy.

17. The excavator of claim 16, wherein the auxiliary actuator is coupled to the boom and the upper carriage at the locations above the hydraulic actuator when the boom is lowered.

18. The excavator of claim 16, wherein the auxiliary actuator and the hydraulic actuator are arranged in parallel and in contact with each other so that the auxiliary actuator and hydraulic actuator overlap, and wherein the auxiliary actuator is at least partially arranged in a same vertical plane positioned along a horizontal axis of the excavator as a main hydraulic actuator.

19. The excavator of claim 16, wherein the hydraulic actuator of the main hydraulic system and the auxiliary actuator of the auxiliary actuation system are arranged in parallel to each other, and wherein the main hydraulic system and the auxiliary actuator system have a length extending between the boom and the upper carriage that is the same.

\* \* \* \* \*